4 Sheets—Sheet 3.
E. H. STEARNS.
Saw-Mill Dog.
No. 213,002. Patented Mar. 4, 1879.
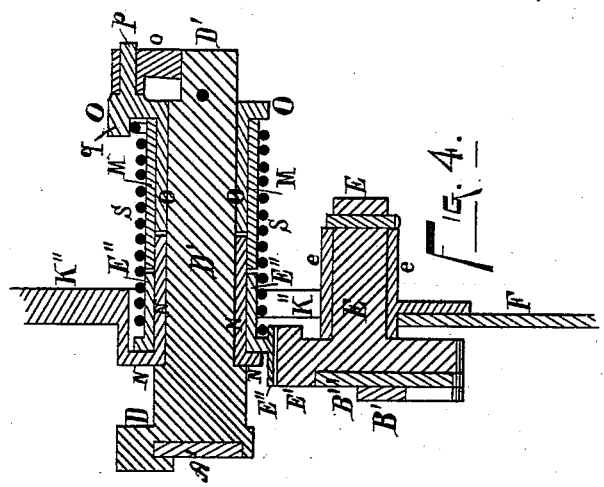
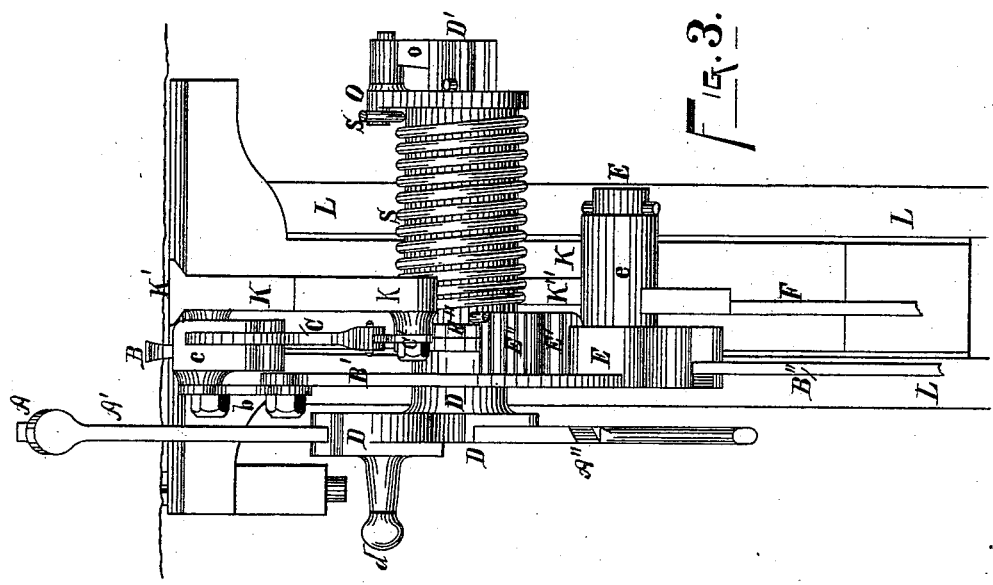
Witnesses,
Jas. S. Miller
W. J. Coughlin
Inventor,
Edward H. Stearns.
Per Jno K Hallock
Att'y.

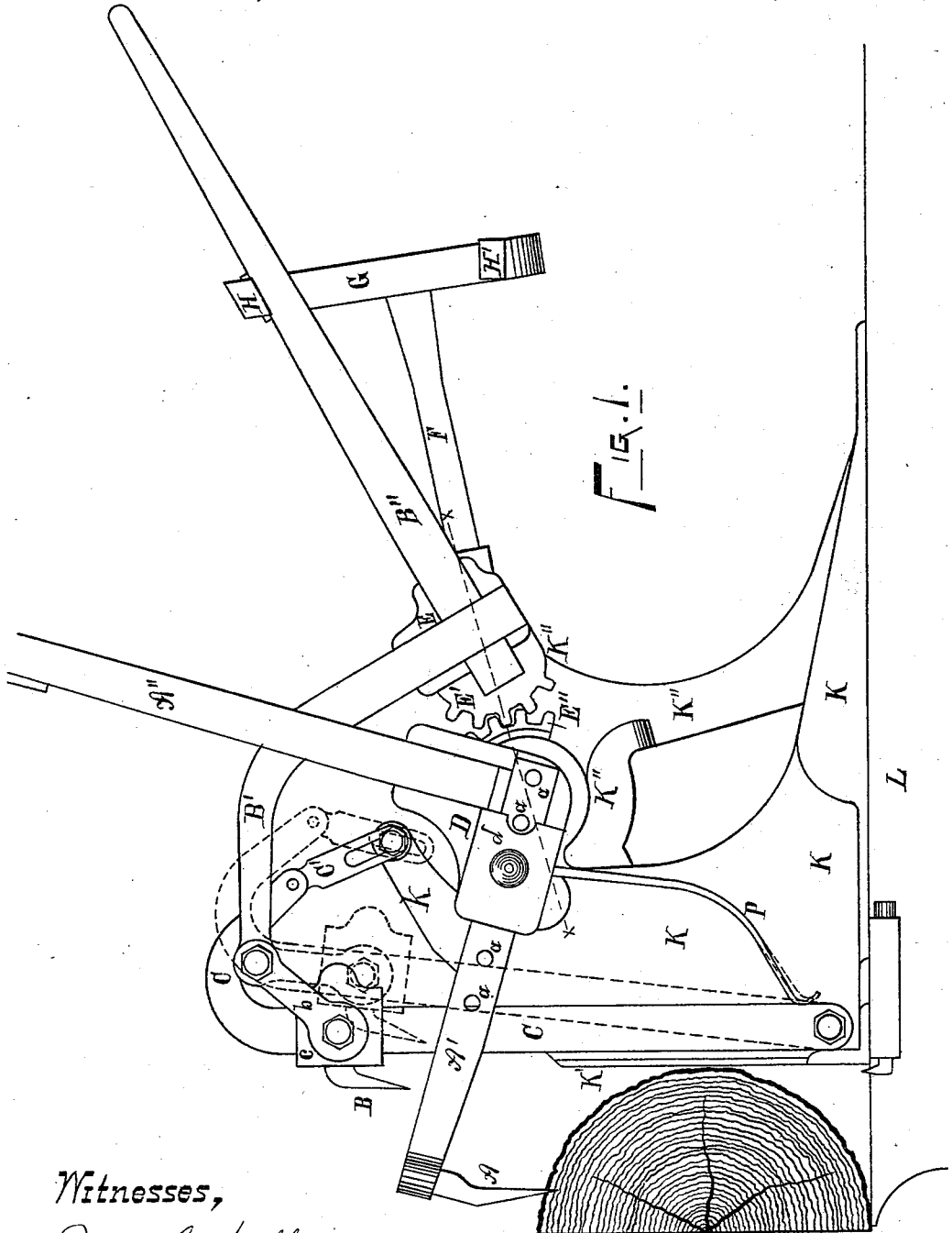

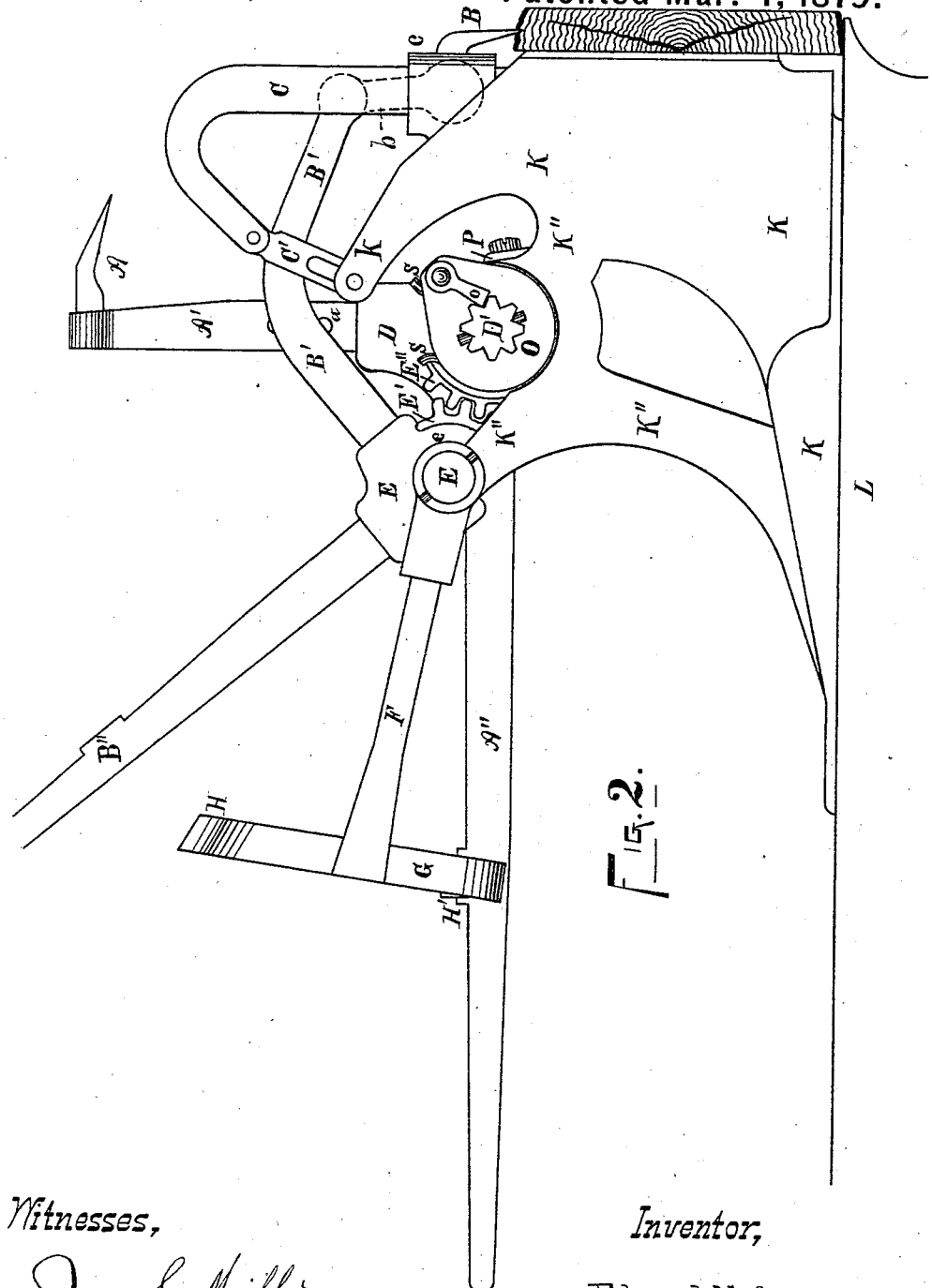

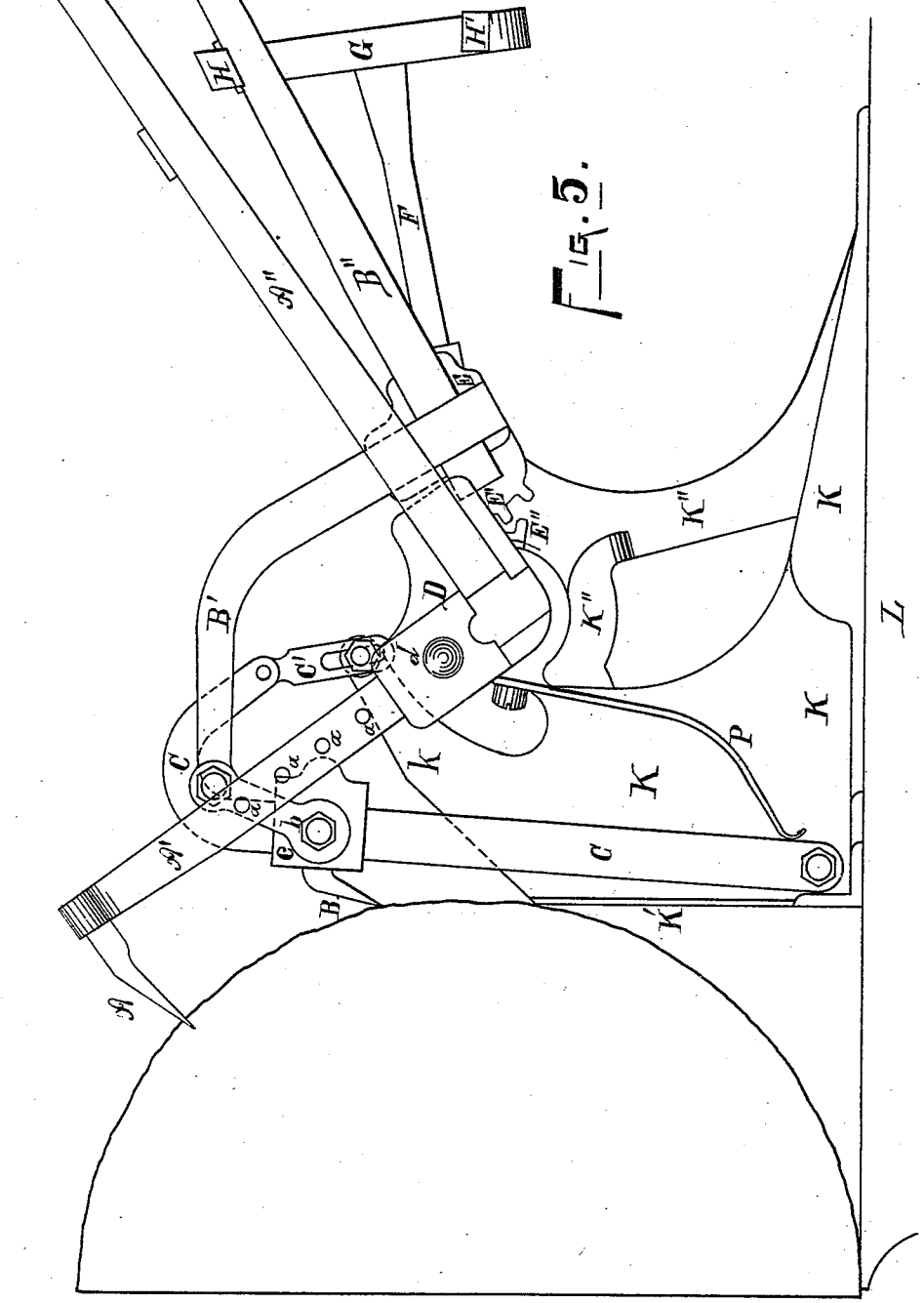

UNITED STATES PATENT OFFICE.

EDWARD H. STEARNS, OF ERIE, PENNSYLVANIA.

IMPROVEMENT IN SAW-MILL DOGS.

Specification forming part of Letters Patent No. 213,002, dated March 4, 1879; application filed December 21, 1878.

*To all whom it may concern:*

Be it known that I, EDWARD H. STEARNS, of Erie, in the county of Erie and State of Pennsylvania, have invented a new and useful Improved Saw-Mill Dog; and I do hereby declare the following to be a full, clear, and exact description thereof.

The nature, objects, and purpose of my invention will fully appear in the following description and claims.

My device is shown in the accompanying drawings, as follows, there being four sheets and five figures.

Figure 1 is a side view, and shows the dog in use upon a log. Fig. 2 is a similar view of the opposite side, and shows the dog in use upon a board or cant. Fig. 3 is a top or plan view of the device when in the position shown in Fig. 1. Fig. 4 is a section of parts on the line $x\ x$ in Fig. 1. Fig. 5 is a view like Fig. 1, but shows a larger log upon the blocks.

The device consists of two dogs, one a log-dog and the other a cant or board dog. These are arranged upon the knee and adapted to be forced into the log or cant by the action of a strong actuating-spring.

One of the principal features of my invention consists of the use of springs, or some equivalent device, for forcing the dogs into the log or cant, as will be hereinafter made fully clear. Each dog is provided with a lever or handle, which comes within easy reach of the setter as he stands at his post. A suitable and sure-acting catch device is provided for retaining the handles when they are drawn down so as to remove the dog from action, and from which they can readily be disengaged when it is desired to throw a dog into action.

A is the log-dog, and B is the board-dog. Of these, A, the log-dog, is attached to the arm A′, which is made adjustable in a socket on the pivot-block, by which means this dog can, when desired, be drawn in, so as to operate upon heavy cants, if wanted. The pivot or journal of this dog is on an extension or bracket, K″, which is cast solid with the knee K, and is of such a height above and distance back of the face of the knee or standard as to allow the said pivot to be at such a point that, with a proper length of arm, the dog will have a sweep or arc of motion by which it is enabled to grasp firmly logs of every size without readjusting the length of the arm. This is particularly advantageous when a log of large dimensions comes upon the blocks, as is seen in Fig. 5, where it will be observed that, no matter how far the log may come above and back of the top of the standard, the dog A will grasp the log at such a distance from the point of contact of the knee as to have sufficient purchase to hold the log from rolling as it is slid forward by the action of the setting mechanism.

The board-dog B is attached to a block, c, which slides on an upright bar, C, which stands beside and rises above the upright or knee. By this means the dog can rise high enough to engage with the edge of the highest cants. The upright bar C is pivoted to the knee at the foot of the standard, so that it may swing back, as shown in Fig. 5, and by dotted lines in Fig. 1, and allows logs of great size to come back over the top of the standard.

The board-dog grasps the cant on its edge, and does not mar the face of the lumber, and it strikes so close to the side of the cant that the last board may be less than an inch in thickness.

Both dogs are actuated by spring-power, and, as arranged in the drawings, the same spring serves for both dogs. This is practical, for usually only one dog is in use at a time, and even when they are both used the spring is capable of operating them. The manner of applying the spring and the form or kind of spring used may be varied; and I do not claim to be limited to the spring or devices for applying the same as I show them in the drawings.

My invention, in this particular, broadly consists in the employment of springs, so applied that when the dog is released from proper retaining devices the springs will automatically force the dog into the log or cant, whereby the setter does not have to use any force or power to set the dogs other than to release them from the retaining devices. The spring, besides automatically setting the dog into the log or cant, also serves, by reason of its continuous pressure, to prevent the dog working out by reason of the jarring incident to the process of sawing. In fact, the spring acts to deepen the hold of the dog as the timber is vibrated by the jarring.

To enable persons skilled in the art to construct one of my dogging devices, I will proceed to give a more detailed description of the device, as illustrated in the drawings.

L is the bed-piece, on which the log rests and in which the knees slide. K is the knee, and K' is its standard, and K'' is a framework or bracket cast upon the knee, and to which the dogs are pivoted. In this framework are cast two journal boxes or barrels, in one of which, N, the log-dog is pivoted, and in the other, e, the actuating-lever of the board-dog is pivoted. D D' is the journal block or shaft of the log-dog, and E is that of the board-dog lever.

A'' and B'' are the levers or handles of the dogs. When the dogs are not in action these levers are retained in catches H H' on a T-arm, F G, which extends out from the bracket K''. The arm A' of the log-dog runs in a socket in the journal-block D, and may be held in various positions by the spring-pin d, which enters holes a in the arm. The dog B is attached to a sliding block, c, on the upright bar C, and is connected with the journal of its actuating-lever B'' by an arm, B', and a link, b. The upright bar C is pivoted at its lower end, and is connected at the top to a projection, k, from the knee by a link, C', which allows the bar to tilt back, but keeps it from going forward beyond a parallel position to the standard K', and a strong leaf-spring, P, keeps it in said parallel position, except when forced back by a large log, as shown in Fig. 5 and by dotted lines in Fig. 1.

The spring which actuates the dog is applied, in this instance, as follows: A coil-spring being used, it is placed on the shaft of the log-dog, and the board-dog lever-journal is connected with it by gearing, so that one spring serves for both dogs. However, if desired, each dog may be provided with a spring and each work independently of the other. I have adopted the plan shown by reason of its compactness and economical construction. Figs. 3 and 4 show the spring and its connection, and, perhaps, Fig. 4, which is a section on the line x x, Fig. 1, shows this part of my invention most clearly.

In this figure the parts shown are as follows: N is the journal-box of the journal-block D D'. This as well as the journal-box E is formed in the casting of the extension K''. The journal-box N is turned up round, so as to receive a sleeve, E'', which has on one side a segment of gearing, which connects with a similar segment, E', of gearing on the block E of the board-dog lever.

O is a sleeve, which fits over that part of the journal D' which extends out of the box N. This sleeve has a flange shaped like a crank, and has on its side a pin, p, which carries a pawl, o, and on the other side is a lug, q, which engages one end of the coil-spring S, which is coiled around it, or rather a loose sleeve, M, which fits over it. The spring also embraces in its coil the sleeve E'', and engages with a projection from its flange. The pawl o fits in notches on the end of the shaft D', and by turning the sleeve O so as to wind up the spring, and then setting the pawl o against the shaft D', the tension of the spring is exerted against the said shaft, and also against the sleeve E''. Consequently the power of the spring can be exerted to revolve the shaft D', and thus throw forward the dog A, if its lever A'' is released from its retaining-catch, or it will, through the sleeve E'' and its gearing-connection with the journal-block of the lever B'', throw down the dog B if its handle B'' is released from its retaining-catch.

An actuating device for automatically actuating the dogs of a dogging device need not be limited in its use to the precise dogging device shown. For example, the board-dog may be arranged to grasp the side of the board in place of the edge, as is common, and yet be connected by proper mechanism with the actuating device, so that it can be actuated by it. For board-dogs of that description the spring or actuating device for automatically throwing them into the face of the cant or board may be distinct from that which operates the log-dog, and it may be placed in some other place upon the knee than that shown. The position of the device for actuating the dog will depend entirely on the style of dog used and the form and kind of spring-motor, and also on the form of connecting mechanism. As regards the kind of spring, it may be a coil, as shown, a torsion, a leaf, or a helical spring, or it may be of rubber or compressed air.

I am aware that cant-dogs—that is, a lever and a dog used for rolling logs—have been constructed with the dog provided with a spring for keeping the dog against the log; but such a device has no relation whatever to my invention, and forms no part of the same.

What I claim as new is—

1. The combination of a saw-mill dog with a spring, arranged to automatically force the dog into the log, substantially as set forth.

2. In the dogging mechanism of a saw-mill head-block in which a spring is employed to automatically force the dog into the log or cant, the combination therewith of a retaining device for withholding said dog from action, substantially as set forth.

3. The combination of the tooth or dog A, arm A', journal-block D D', affording a bearing for a spring, and lever, A'', substantially as set forth.

4. The log-dogging mechanism of a saw-mill head-block, consisting of a tooth or bit, a pivoted arm carrying said tooth or bit, a device for automatically actuating said arm, a device for withdrawing said arm and bit, and a device for retaining the same when withdrawn, all constructed and arranged to operate substantially as set forth.

5. The combination of the tooth or bit B, sliding block *c*, upright bar C, link *b*, arm B′, journal-block E, and lever B″, substantially as and for the purposes set forth.

6. The combination of the dog B and sliding block *c* with an upright bar, C, pivoted at its foot, substantially as set forth.

7. The combination, with the pivoted upright bar C, carrying a dog, of the slotted link C′, substantially as set forth.

8. The combination, with the pivoted upright bar C, carrying a dog and a retaining device for limiting its forward movement, of a spring for automatically holding it in an upright position, substantially as set forth.

9. The board-dogging mechanism of a saw-mill head-block, consisting of a bit or tooth for grasping the board or cant, a device for automatically actuating said bit, and mechanism for connecting said actuating device with said bit, all substantially as and for the purposes set forth.

10. The combination, with the journal-block E, sleeve E″, and spring S, of connecting-gearing joining said sleeve and said block, substantially as and for the purposes set forth.

11. The combination of the T-arm F G and catches H H′ with the levers A″ B″, substantially as and for the purposes mentioned.

12. The dogging mechanism of a saw-mill head-block, consisting of a log-dog and a board or cant dog, and an actuating device arranged to automatically actuate either of said dogs singly or both together, substantially as set forth.

In testimony whereof I, the said EDWARD H. STEARNS, have hereunto set my hand.

EDWARD H. STEARNS.

Witnesses:
   JNO. K. HALLOCK,
   GEO. P. GRIFFITH.